(12) United States Patent     (10) Patent No.: US 8,528,682 B2
Fuechtner     (45) Date of Patent: Sep. 10, 2013

(54) HYBRID DRIVE TRAIN

(75) Inventor: Martin Fuechtner, Stuttgart (DE)

(73) Assignee: Dr. Ing. H.C.F. Porsche Aktiengesellschaft (DE)

( * ) Notice: Subject to any disclaimer, the term of this patent is extended or adjusted under 35 U.S.C. 154(b) by 0 days.

(21) Appl. No.: 13/704,815

(22) PCT Filed: Apr. 1, 2011

(86) PCT No.: PCT/EP2011/001659
§ 371 (c)(1),
(2), (4) Date: Dec. 18, 2012

(87) PCT Pub. No.: WO2011/157312
PCT Pub. Date: Dec. 22, 2011

(65)          Prior Publication Data
US 2013/0087400 A1     Apr. 11, 2013

(30)        Foreign Application Priority Data

Jun. 17, 2010 (DE) .......................... 10 2010 017 420

(51) Int. Cl.
*B60K 1/02*        (2006.01)
(52) U.S. Cl.
USPC .............................. 180/69.6; 477/3; 180/65.1
(58) Field of Classification Search
USPC .......... 180/54.1, 65.1, 65.245, 65.235, 65.26, 180/65.265, 65.27, 65.275, 65.29, 65.31; 475/4, 9; 477/3, 5, 7
See application file for complete search history.

(56)          References Cited

U.S. PATENT DOCUMENTS

| 7,174,978 | B2* | 2/2007 | Taniguchi et al. ........... 180/65.1 |
| 8,047,959 | B2* | 11/2011 | Fuechtner et al. ................. 477/5 |
| 8,061,464 | B2* | 11/2011 | Boesch ......................... 180/197 |
| 8,215,440 | B2* | 7/2012 | Hoffmann et al. ............ 180/247 |
| 8,360,183 | B2* | 1/2013 | Sauvlet et al. ............. 180/65.28 |
| 2010/0193269 | A1 | 8/2010 | Fuchtner et al. |

FOREIGN PATENT DOCUMENTS

| DE | 199 54 544 | 8/2001 |
| DE | 103 14 182 | 11/2003 |
| DE | 10 2005 037 776 | 2/2007 |
| DE | 10 2006 014 514 | 10/2007 |
| DE | 10 2007 031 605 | 1/2009 |
| GB | 2 452 063 | 2/2009 |
| WO | 95/33630 | 12/1995 |

OTHER PUBLICATIONS

International Search Report of Jun. 8, 2011.

* cited by examiner

*Primary Examiner* — John Walters
*Assistant Examiner* — James Triggs
(74) *Attorney, Agent, or Firm* — Gerald E. Hespos; Michael J. Porco; Matthew T. Hespos

(57)          ABSTRACT

The invention relates to a hybrid drive-train of a motor vehicle (1) equipped with a mechanical all-wheel drive, said drive-train comprising a combustion engine (5) which can be drive-connected to two axles (5) by means of a transmission (6), and a transversally installed electric machine arrangement (10). In order to improve the hybrid drive-train, particularly with regard to an operational mode that is highly dynamic, the electric machine arrangement is arranged approximately central in relation to the transverse direction of the vehicle.

18 Claims, 2 Drawing Sheets

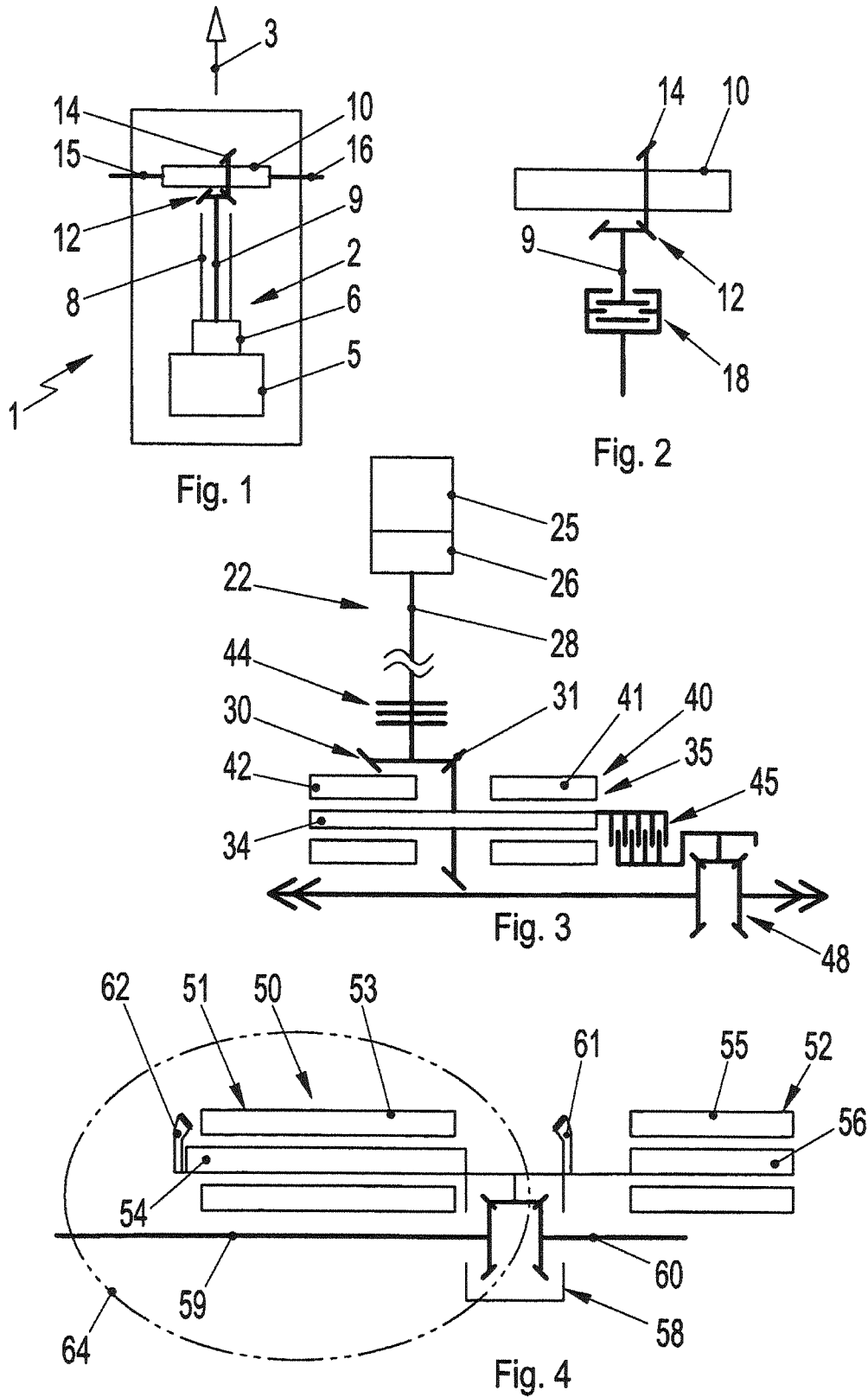

HYBRID DRIVE TRAIN

BACKGROUND OF THE INVENTION

1. Field of the Invention

The invention relates to a hybrid drive train of a motor vehicle which is equipped with a mechanical all-wheel drive, having an internal combustion engine which can have a drive connection to two axles via a transmission, and having a transversely installed electric machine arrangement.

2. Description of the Related Art

The object of the invention is to improve a hybrid drive train according to the preamble of claim 1, in particular with respect to a highly dynamic driving style.

The object is achieved in a hybrid drive train of a motor vehicle which is equipped with a mechanical all-wheel drive, having an internal combustion engine which can have a drive connection to two axles via a transmission, and having a transversely installed electric machine arrangement, in that the electric machine arrangement is arranged approximately centrally in the transverse direction of the vehicle. The terms transverse and transverse direction relate to a motor vehicle having the hybrid drive train. The electric machine arrangement can be assigned alone or together with the internal combustion engine to a front axle or a rear axle of the motor vehicle. The approximately central arrangement of the electric arrangement considerably reduces the expenditure in terms of manufacturing in order to implement the motor vehicle as a right-handed steered or left-handed steered vehicle.

SUMMARY OF THE INVENTION

One preferred exemplary embodiment of the hybrid drive train is characterized in that a crown wheel of a bevel gear drive is attached to a rotor of the electric machine arrangement. The rotor of the electric machine arrangement can be coupled to the internal combustion engine via the bevel gear drive. Alternatively, the crown wheel of the bevel gear drive is attached to a transmission arranged downstream of the electric machine arrangement, for the purpose of coupling the electric machine arrangement to the internal combustion engine. When a spur gear drive which is arranged downstream of the electric machine arrangement is used, the crown wheel of the bevel gear drive can also be mounted on a lay shaft with a spur gear of the spur gear drive in order to couple the electric machine arrangement to the internal combustion engine. This requires only slight modifications in the configuration in order to permit coupling of the electric machine arrangement to the internal combustion engine.

A further preferred exemplary embodiment of the hybrid drive train is characterized in that a differential, which is preferably partially locked or can be locked in a controlled fashion, is assigned to the electric machine arrangement. As a result, in the case of a highly dynamic driving style it is also ensured that the power of the electric machine arrangement can be utilized in an optimum way.

A further preferred exemplary embodiment of the hybrid drive train is characterized in that the electric machine arrangement comprises an internal rotor electric machine with a rotor and a stator which is divided in two and comprises two stator halves which are spaced apart from one another in the transverse direction. According to one exemplary embodiment, the electric machine arrangement comprises precisely one internal rotor electric machine. The two stator halves are preferably energized equally during operation.

A further preferred exemplary embodiment of the hybrid drive train is characterized in that a device for outputting and/or distributing torque is arranged between the two stator halves, which device comprises, for example a crown wheel of a bevel gear drive and/or a differential. The device for outputting or distributing torque is preferably arranged centrally in the transverse direction of the vehicle.

A further preferred exemplary embodiment of the hybrid drive train is characterized in that the two stator halves comprise windings which are connected to one another. This provides the advantage that only one power electronic system is required to operate the electric machine.

A further preferred exemplary embodiment of the hybrid drive train is characterized in that the electric machine arrangement comprises an external rotor electric machine having a rotor to which a crown wheel of a bevel gear drive is attached. According to one exemplary embodiment, the electric machine arrangement comprises precisely one external rotor electric machine.

A further preferred exemplary embodiment of the hybrid drive train is characterized in that the rotor can have a drive connection to a transmission input shaft via a clutch. When the clutch is closed, a torque can be transmitted from the rotor to the transmission input shaft, or vice versa.

A further preferred exemplary embodiment of the hybrid drive train is characterized in that the rotor can have a drive connection to a differential via a clutch. A torque can be transmitted via the clutch and the differential from the rotor to driven wheels of the motor vehicle.

If the rotor can have a drive connection to the transmission input shaft via a first clutch and to the differential via a second clutch, it is possible to charge a battery of the motor vehicle in the stationary state by means of the electric machine.

A further preferred exemplary embodiment of the hybrid drive train is characterized that the electric machine arrangement comprises two electric machines which are spaced apart from one another in the transverse direction and between which a device for outputting and/or distributing torque is arranged, which device comprises, for example, a crown wheel of a bevel gear drive and/or a differential. The two electric machines are preferably embodied as internal rotor electric machines. The device for outputting and distributing torque is preferably arranged centrally in the transverse direction of the vehicle.

The invention also relates to a motor vehicle having a hybrid drive train which is described above.

Further advantages, features and details of the invention can be found in the following description in which various exemplary embodiments are described in particular with reference to the drawing.

BRIEF DESCRIPTION OF THE DRAWINGS

FIG. 1 shows a highly simplified illustration of a motor vehicle with a hybrid drive train according to the invention.

FIG. 2 shows an enlarged detail from FIG. 1 according to a further exemplary embodiment.

FIG. 3 shows a detail from FIG. 1 according to a further exemplary embodiment with a stator divided in two.

FIG. 4 shows a detail from FIG. 1 with an electric machine arrangement which comprises two electric machines.

DETAILED DESCRIPTION OF THE PREFERRED EMBODIMENTS

Figure 5:
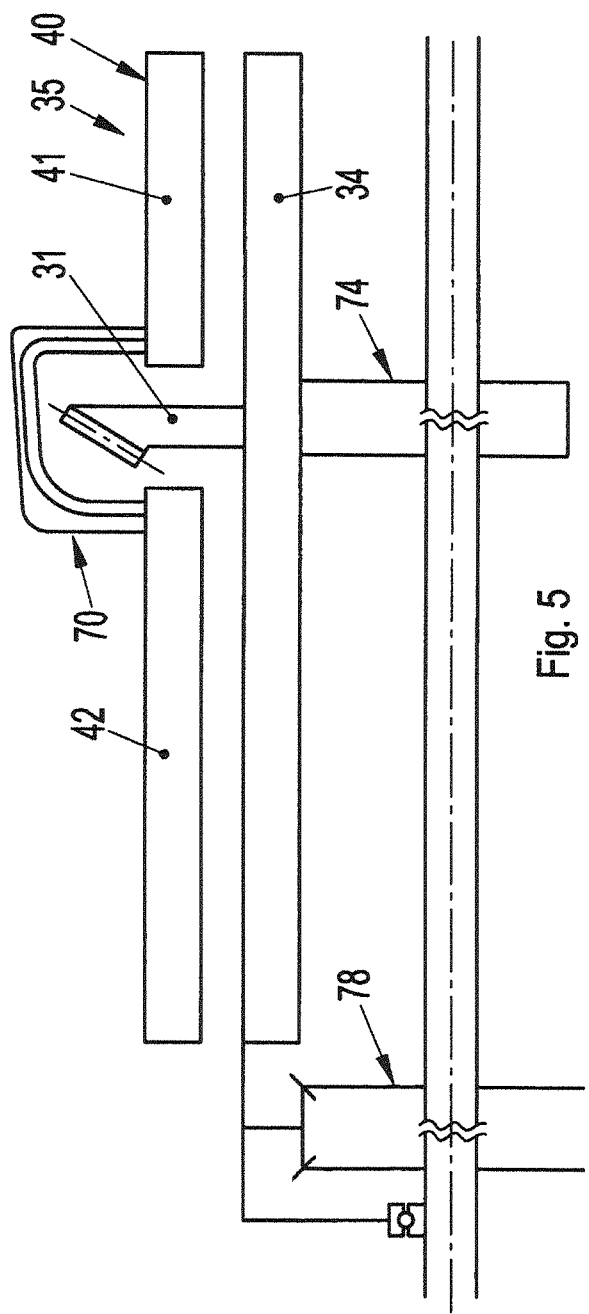
FIG. 5 shows an enlarged detail from FIG. 3 according to further exemplary embodiments.

In FIG. 1, a motor vehicle 1 having a hybrid drive train 2 is illustrated in a highly simplified form. The motor vehicle 1 is also referred to as a hybrid vehicle. A forward direction of travel of the motor vehicle 1, which coincides with the longitudinal direction of the vehicle, is indicated by an arrow 3.

The hybrid drive train 2 comprises an internal combustion engine 5 and a transmission 6. A center tunnel 8, in which a Cardan shaft 9, which forms a drive connection between the transmission 6 and an electric machine 10, is arranged proceeds from the transmission 6.

The electric machine 10 is embodied as an external rotor with a stator which is arranged within a rotor. The Cardan shaft 9 is coupled via a bevel gear drive 12 with the rotor of the electric machine 10. The bevel gear drive 12 comprises a crown wheel 14, which is attached directly to the outside of the rotor of the electric machine 10.

In FIG. 1, the electric machine 10 is arranged in the region of a front axle of the motor vehicle 1 with axle shafts 15, 16. Driven wheels (not illustrated) of the front axle are attached to the free ends of the axle shafts 15, 16. The internal combustion engine 5 is arranged in the region of a rear axle of the motor vehicle 1. The Cardan shaft 9 rotates with the output rotation speed of the transmission 6 during operation.

FIG. 2 illustrates a detail from FIG. 1 according to an exemplary embodiment, in which exemplary embodiment the Cardan shaft 9 is equipped with a clutch 18. The drive connection between the transmission 6 and the electric machine 10 can be interrupted if required by means of the clutch 18.

FIG. 3 illustrates in highly simplified form a hybrid drive train 22 with an internal combustion engine 25 and a transmission 26. The transmission 26 has a drive connection to a rotor 34 of an electric machine 35 via a transmission input shaft 28 and a bevel gear drive 30 which comprises a crown wheel 31.

The electric machine 35 is embodied as an internal rotor with a stator 40 which is divided into two stator halves 41, 42. The crown wheel 31 is attached directly to the rotor 34 of the electric machine 35. In this context, the crown wheel 31 is arranged centrally between the two stator halves 41 and 42.

A clutch 44 is connected between the transmission 26 and the bevel gear drive 30. A clutch 45 is connected between the rotor and a differential 48, via which two driven wheels are driven. The two clutches 44, 45 can be installed alternately or together in the hybrid drive train 22.

If the clutch 44 is opened in FIG. 2 and at the same time the clutch 44 is closed, batteries of the motor vehicle can be charged via the electric machine 35 by the running internal combustion engine when the motor vehicle is stationary. This charging mode is also referred to as stationary charging mode.

In order to drive electrically, the clutch 44 is opened and the clutch 45 is closed. In order to form a mechanical all-wheel operating mode, the clutch 44 is operated closed with controlled slip.

FIG. 4 illustrates an electric machine arrangement 50 with two electric machines 51, 52 in a highly simplified form. The two electric machines 51, 52 are embodied as internal rotors and are installed in the transverse direction of the vehicle. Each of the electric machines 51, 52 comprises a stator 53; 55 and an internally running rotor 54; 56.

A differential 58 is arranged between the two electric machines 51, 52. Two axle shafts 59, 60 can be driven via the differential 58. The two axle shafts 59, 60 can alternatively also each be driven directly by the rotors 54, 56 of the two electric machines 51, 52.

A crown wheel 61 is coupled to the two rotors 54, 56 of the two electric machines 51, 52. A further crown wheel 62, which is coupled to the rotor 54, is indicated on the side of the rotor 54 facing away from the differential 58.

A dashed border 64 indicates a further exemplary embodiment with just one electric machine 51. In this exemplary embodiment, the crown wheel 61 is arranged on one side of the rotor 54, and the differential 58 is arranged on the other side of the rotor 54.

In the exemplary embodiment 64, the electric machine 51 is arranged centrally in the transverse direction of the vehicle. In the exemplary embodiment illustrated in FIG. 4 with the two electric machines 51, 52, the differential 58 or the crown wheel 61 is arranged centrally in the transverse direction of the vehicle.

FIG. 5 illustrates a detail from FIG. 3 in enlarged form, according to further exemplary embodiments. 70 indicates a connection by which windings of the two stator halves 41, 42 are connected to one another. The two stator halves 41, 42 are energized equally. The connection 70 extends in a U shape around the crown wheel 31. The coupling of the crown wheel 31 to the bevel gear drive occurs at a side facing away from the connection 70.

On the side of the rotor 34 facing away from the connection 70, that is to say at the bottom in FIG. 5, a planetary differential 74 is indicated, by means of which axle shafts can be coupled to the rotor 34. At the end of the rotor 34 which is on the left in FIG. 5 a normal differential 78 is indicated, by means of which the axle shafts can be coupled to the rotor 34.

The term "can be coupled" means can have a drive connection in conjunction with the differential.

The exemplary embodiments illustrated in FIGS. 1 to 5 all relate to a hybrid vehicle having at least one electric machine which is installed transversely with respect to the direction of travel. One of the axles is driven by the internal combustion engine. The other axle can be driven by the electric machine via the bevel gear drive.

The electric machine is connected mechanically here to the transmission input shaft or the internal combustion engine or to the transmission output shaft. As a result, a mechanical all-wheel drive which can be used universally is provided for a hybrid vehicle with a front-mounted engine arrangement, rear-mounted engine arrangement or center-mounted engine arrangement.

Figure 6:
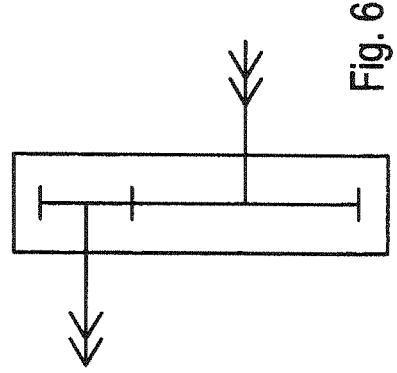
FIG. 6 shows a simplified illustration of a gantry transmission.

The gantry transmission indicated in FIG. 6 allows the respective electric machine to be positioned lower, than in the case of a direct arrangement, in order to shift the center of gravity.

Figure 7:
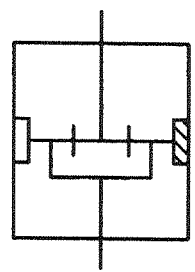
FIG. 7 shows a simplified illustration of a planetary gear mechanism.

FIG. 7 indicates a planetary gear mechanism such as can be used for illustrating the planetary differential 74 in FIG. 5.

The invention claimed is:
1. A hybrid drive train of a motor vehicle that is equipped with a mechanical all-wheel drive, the hybrid drive train comprising: an internal combustion engine; a transmission for selectively establishing a drive connection between the internal combustion engine and two axles of the motor vehicle; a transversely installed electric machine arrangement arranged approximately centrally in a transverse direction of the vehicle, the electric machine arrangement having an internal rotor electric machine with a rotor and a stator that is divided in two and comprises two stator halves that are spaced apart from one another in the transverse direction; and a device arranged between the two stator halves for outputting or distributing torque, the device including a bevel gear drive with a crown wheel attached to a rotor of the electric machine arrangement.

2. The hybrid drive train claim 1, characterized in that a differential, which is at least partially lockable in a controlled fashion, is assigned to the electric machine arrangement.

3. The hybrid drive train of claim 1, characterized in that the two stator halves comprise windings which are connected to one another.

4. A hybrid drive train of a motor vehicle that is equipped with a mechanical all-wheel drive, the hybrid drive train comprising: an internal combustion engine; a transmission for selectively establishing a drive connection between the internal combustion engine and two axles of the motor vehicle; a transversely installed electric machine arrangement arranged approximately centrally in a transverse direction of the vehicle; and a bevel gear drive with a crown wheel attached to a rotor of the electric machine arrangement, wherein the electric machine arrangement comprises an external rotor electric machine having a rotor to which the crown wheel of the bevel gear drive is attached.

5. The hybrid drive train claim 1, characterized in that the rotor is connectable to a transmission input shaft via a clutch.

6. The hybrid drive train claim 1, characterized in that the rotor is connectable to a differential via a clutch.

7. The hybrid drive train of a motor vehicle that is equipped with a mechanical all-wheel drive, the hybrid drive train comprising: an internal combustion engine; a transmission for selectively establishing a drive connection between the internal combustion engine and two axles of the motor vehicle; a transversely installed electric machine arrangement arranged approximately centrally in a transverse direction of the vehicle; and a bevel gear drive with a crown wheel attached to a rotor of the electric machine arrangement, wherein the electric machine comprises two electric machines that are spaced apart from one another in the transverse direction and between which a device for outputting and/or distributing torque is arranged, which device comprises, the crown wheel of the bevel gear drive or a differential (68).

8. A motor vehicle having the hybrid drive train of claim 1.

9. The hybrid drive train claim 4, characterized in that a differential, which is at least partially lockable in a controlled fashion, is assigned to the electric machine arrangement.

10. The hybrid drive train of claim 4, characterized in that the two stator halves comprise windings which are connected to one another.

11. The hybrid drive train claim 4, characterized in that the rotor is connectable to a transmission input shaft via a clutch.

12. The hybrid drive train claim 4, characterized in that the rotor is connectable to a differential via a clutch.

13. A motor vehicle having the hybrid drive train of claim 4.

14. The hybrid drive train claim 7, characterized in that a differential, which is at least partially lockable in a controlled fashion, is assigned to the electric machine arrangement.

15. The hybrid drive train of claim 7, characterized in that the two stator halves comprise windings which are connected to one another.

16. The hybrid drive train claim 7, characterized in that the rotor is connectable to a transmission input shaft via a clutch.

17. The hybrid drive train claim 7, characterized in that the rotor is connectable to a differential via a clutch.

18. A motor vehicle having the hybrid drive train of claim 7.

* * * * *